Aug. 12, 1941. J. BERGMANS ET AL 2,252,246
OPTICAL SYSTEM
Filed Dec. 12, 1939 2 Sheets-Sheet 1
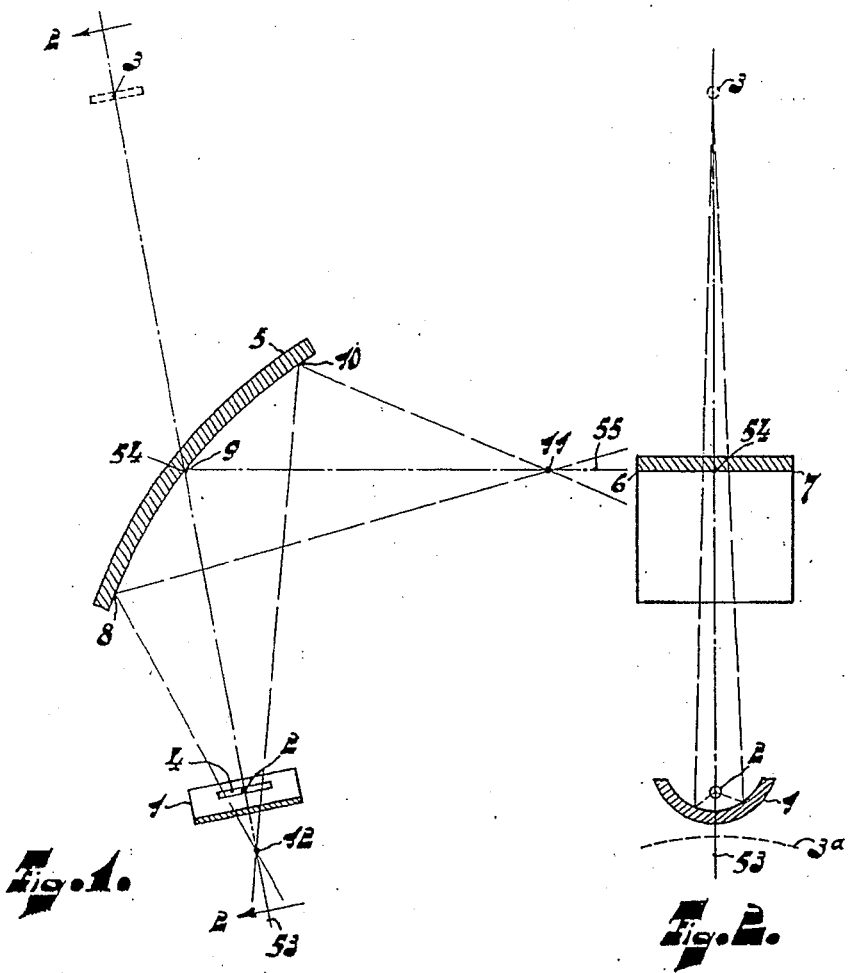
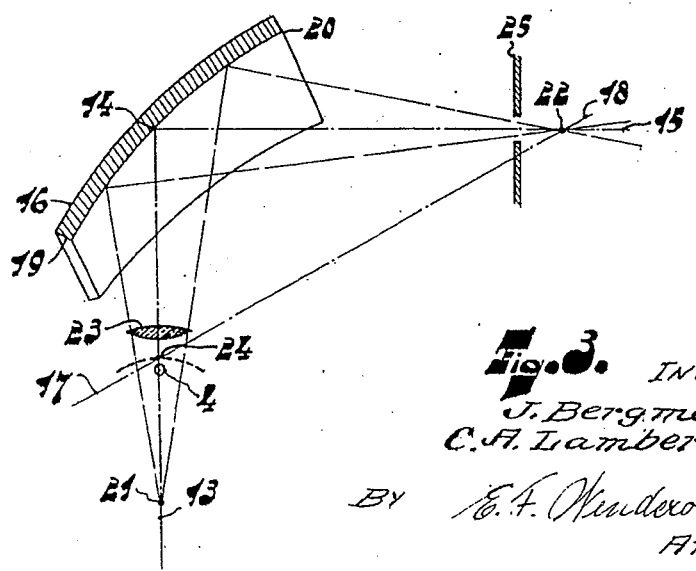
INVENTORS
J. Bergmans and
C. A. Lamberts
BY E. F. Wenderoth
ATTORNEY Aug. 12, 1941.   J. BERGMANS ET AL   2,252,246
OPTICAL SYSTEM
Filed Dec. 12, 1938   2 Sheets-Sheet 2
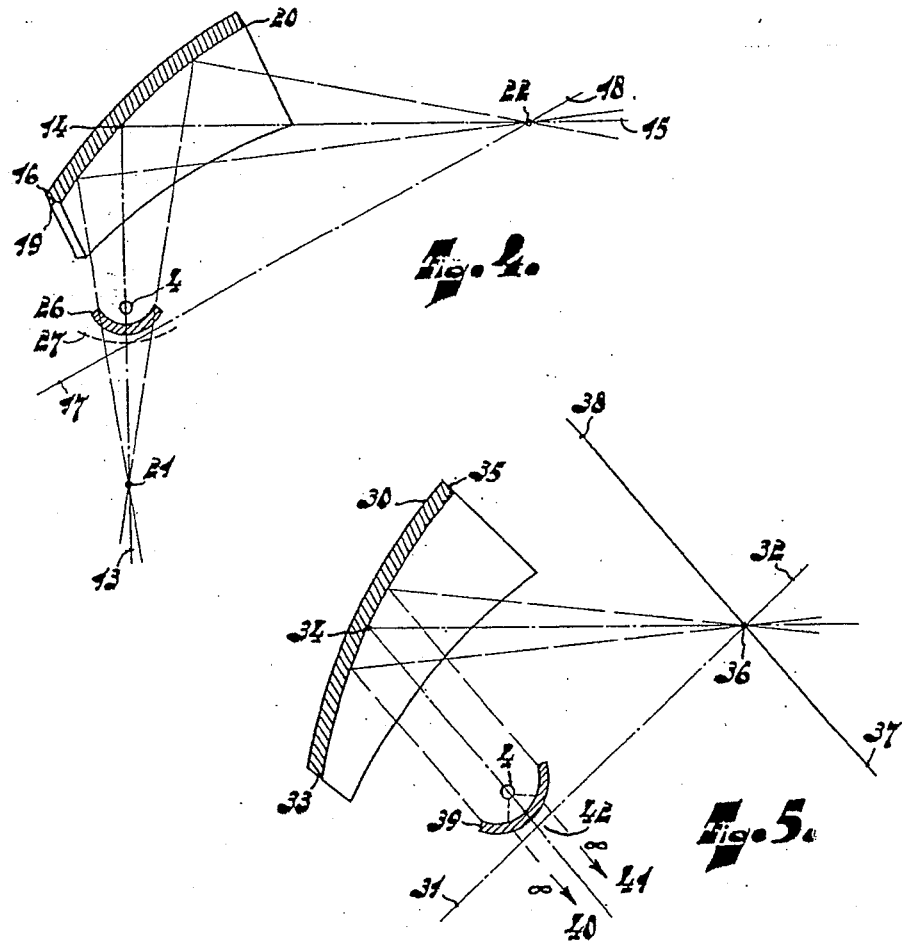
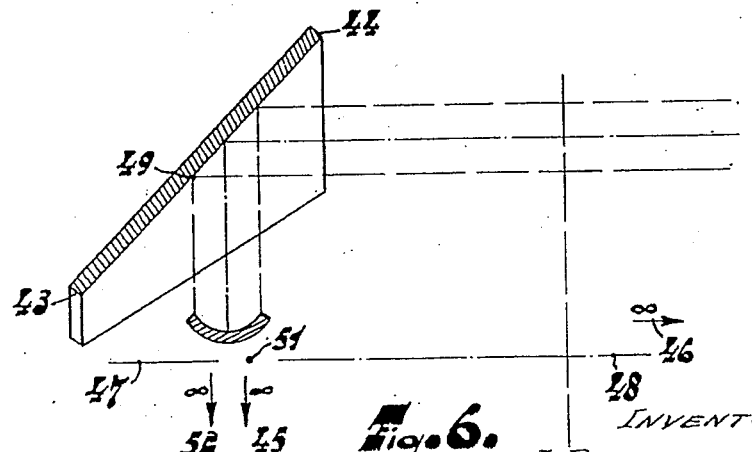
INVENTORS
J. Bergmans and
C. A. Lamberts
BY
ATTORNEY Patented Aug. 12, 1941

2,252,246

UNITED STATES PATENT OFFICE 2,252,246

OPTICAL SYSTEM

Jan Bergmans and Clamor August Lamberts, Eindhoven, Netherlands, assignors, by mesne assignments, to Hartford National Bank and Trust Company, Hartford, Conn., as trustee Application December 12, 1938, Serial No. 245,294
In the Netherlands December 15, 1937

3 Claims. (Cl. 88—24)

Our invention relates to optical systems comprising a linear light source.

For many purposes, for example in motion picture projections, it is desirable to transform the light emitted by a linear light source into a luminous plane or light spot of large area, and to do this it is generally necessary to magnify the light source to different degrees in its longitudinal and transverse directions. As is well known, it is impossible to accomplish this with the use of only one cylindrical lens or mirror because of the resulting astigmatism.

To avoid this astigmatism it has been proposed to use an optical system comprising two cylindrical elements, for instance lenses, whose cylinder axes are perpendicular to each other. However, such a system has the disadvantage that the lens which concentrates the light in the plane passing through the longitudinal axis of the light source must intercept the light over a solid angle which is as large as the solid angle of the light concentrated in a plane perpendicular to this axis by the second lens, and therefore this first lens has to be of abnormally large size and thickness.

The object of our invention is to overcome the above disadvantage.

Another object of the invention is to transform a linear light source into a luminous plane which may serve for example for illumination of the film gate or to reproduce the light source at infinity and thereby provide an optical system which is suitable for example, for searchlights.

In accordance with the invention we subject the light emitted by the light source to a cylindrical optical element and then pass the same to a mirror having a reflecting surface of "double-curvature" and a "main axis" which is perpendicular to that of the element. The light source, optical element and cylindrical mirror are so arranged relatively to one another that the light source and optical element are located outside the light beam reflected by the cylindrical mirror with the result that the efficiency of the system is increased.

The term "optical element" is to be understood to include both a mirror and a lens. The term surface of "double-curvature" is to be understood to mean a surface which has different curvatures, and thus different magnifications, in two directions which are perpendicular to each other. Such a surface would include a surface of rotation formed by a straight line rotated about an axis, a cylindrical surface formed by a straight line moved parallel to itself along a curve, and a toroidal surface formed by a curve rotated about a straight line. In the first two cases there is no magnification in the direction of the straight line and such a mirror or lens acts on the rays of light as a plane mirror or a plano-parallel plate.

The term "main axis" is to be understood to mean that axis of a "double-curvature" mirror or lens which is perpendicular to an element of the surface that extends in the direction of greatest curvature and which intersects the axis of the optical system.

As regards the "optical element" two systems of divergence points are to be considered. First this optical element acts in some way or other on the light source in the longitudinal direction thereof, and generally has practically no magnifying effect in this direction. When considering the course of the rays emitted by the light source, after reflection or refraction by the optical element and in a plane passing through the longitudinal axis of the light source, it is possible to indicate a virtual luminous member which would occupy the position of the light source itself if the optical element were not present. As this virtual member apparently emits light and light beams diverge therefrom, we may here speak of an "axial" divergence point of the optical element. Upon considering the course of the rays, after reflection or refraction, in other planes passing through the axis of the light source, other virtual luminous members may be indicated. Consequently we obtain several such "axial" points of divergence and the locus of these points will be considered as the "locus of the axial divergence points" of the course of the rays of this element.

Secondly, when considering a section through the optical element in a plane perpendicular to the longitudinal axis of the light source another virtual object acts as an apparently luminous member for the "double-curvature" mirror which follows the optical system in the path of the rays, which object has substantially the shape of a point and apparently radiates light. When considering similar planes other virtual objects points may be determined. Since these planes are perpendicular to the longitudinal axis of the light source, these points may be referred to as "transverse divergence points" of the course of the rays of the optical element, and the locus of these points will be referred to as the "locus of the transverse divergence points."

Thus, the more the linear light source is to be enlarged in the transverse direction than in the axial direction, the more remote the locus of the transverse divergence points must be from the locus of the axial divergence points; the latter points being generally located in the immediate vicinity of the optical element.

In one embodiment of the invention the active surface of the "double-curvature" mirror is formed by moving a straight line generatrix parallel to itself along a conic directrix. This conic directrix may be a part of a circle, an ellipse, a parabola or a hyperbola, but we prefer to use an arc of an ellipse having one focus, as considered in the plane passing through the axis of the optical system which comprises the light source, located in or in the immediate vicinity of the convergence point of the light reflected from this mirror, and its other focus in or near the point of intersection of the locus of the axial divergence points of the optical element with this plane. With a "double-curvature" mirror of such shape we prefer to use, as the optical element, a cylindrical mirror whose active surface is formed by moving a straight line generatrix parallel to itself along a directrix in the form of an arc of an ellipse. One focal line of this elliptical mirror coincides with the longitudinal axis of the light source and its other focal line coincides, or at least substantially coincides, with the locus of the transverse divergence points of the "double curvature" mirror, which latter locus in this case would be a straight line. With the use of optical elements of other shapes this locus also assumes another shape.

It is also possible to use a "double curvature" mirror whose reflecting surface is a surface of revolution. The shape of the generatrix depends on the transverse section of the beam of rays to be formed by the system, whereas the axis of rotation passes directly along or through the locus of the axial divergence points of the path of the rays of the optical element and through the convergence point of the light rays reflected from this mirror of revolution. This mirror has such an effect on the light rays falling thereon and originating from the optical element that the astigmatism caused by the optical element is practically eliminated, so that at the desired point an image of the linear light source is produced, which image has a certain extension both in the longitudinal and in the transverse directions.

The selection of the shape of the generatrix depends on the location and shape of the light spot to be reproduced. If, for example, it is desired to illuminate the film gate of a film-projection apparatus, this generatrix may be the arc of an ellipse which has one focus located at the film gate or in the neighborhood thereof, and the other focus located in or in the immediate vicinity of the locus of the transverse divergence points of the path of rays of the optical element. When this line revolves about the axis the latter locus consequently follows this revolution. Furthermore, this arc of an ellipse may change in different ways into another conic section. For example it is possible to shift the first-mentioned focus to infinity, at the same time shifting the locus of the transverse divergence points to infinity. The shape of the optical element is thus determined in one direction since it now becomes a mirror or a lens which radiates a beam of light whose rays are all substantially parallel to a plane passing through the longitudinal axis of the light source and parallel to the principal direction of radiation of the optical element. Due to this displacement, the initially-elliptical arc assumes the shape of a parabola. Its axis is perpendicular to the axis of revolution, and as the focus of the parabola is located in or near the film gate, all the rays of light issuing from the optical element are concentrated in the focus of the parabola. If both the optical element and the mirror of revolution have a parabolic shape we obtain the advantage that a system practically free from abberation is obtained.

It is also possible, however, to change the elliptical arc into a parabola by shifting to infinity the focus which is initially located in the point of convergence of the beam of rays proceeding from the mirror of revolution, with the result that at the same time this point of convergence is also shifted to infinity and a parallel beam of light proceeds from the mirror of revolution, which beam may be utilised, for example, for search lights.

If both foci of the ellipse are shifted to infinity, the elliptical arc changes into a straight line so that the mirror of revolution assumes the shape of a conical surface, which, when the light rays from the optical element are parallel to the plane passing through the longitudinal axis of the source of light and located parallel to the principal direction of radiation and fall on the mirror of revolution, forms these rays into a parallel beam of light.

In order that the invention can be clearly understood and readily carried into effect, I shall describe the same in more detail with reference to the accompanying drawings in which:

Figure 1 is a sectional view of an optical system according to the invention,

Fig. 2 is a section along line 2—2 of Fig. 1, and

Figs. 3 to 6 are sectional views of optical systems according to other embodiments of the invention.

The optical system shown in Figure 1 has a bent axis 53—54—55 and comprises an optical element 1 in the form of an elliptical cylindrical mirror whose reflecting surface is generated by moving a straight line parallel to the plane of Figure 1 along a portion of an ellipse lying in a plane perpendicular to this plane and having its foci at points 2 and 3 (see Fig. 2).

Disposed at the main axis of mirror 1 is a linear light source 4. A suitable light source of this purpose has been described in the U. S. Patents 2,094,694 and 2,094,695 to Bol et al.

The light reflected by mirror 1 passes to a mirror 5 having a "double-curvature" reflecting surface formed by moving a straight line 6—7 (Fig. 2) over an arc 8—9—10 of an ellipse whose foci are located at points 11 and 12. Point 11 lies in the locus of the convergence points of the beam of light reflected by mirror 5, whereas point 12 lies in the locus of the axial divergence points of mirror 1. In Fig. 1 the main axis of the mirror 5 is perpendicular to the plane of the drawing and intersects the curve 8—9—10 in point 9.

The light rays reflected by mirror 5 appear to proceed from a point 3 at which a virtual image of light source 4 is formed. When considered the light reflected by mirror 1 in a plane passing through the longitudinal axis of light source 4 and coinciding with the plane of Figure 1, this light apparently proceeds from an axial divergence point 12. When considering all planes passing through the longitudinal axis of the light source, a locus of these divergence points will be formed, which locus 3ª as indicated in a dotted line in Figure 2 is an arc of a circle due to the laws of reflection.

The system illustrated in Figure 3 has a bent or kinked axis 13—14—15 and comprises the linear light source 4 whose axis extends perpendicular to the plane of the figure, and a mirror 16 having a "double-curvature" reflecting surface which is a surface of revolution formed by rotating an elliptical arc about an axis. More particularly, this surface is formed by rotating about an axis 17—18 an arc 19—20 of an ellipse whose foci are located at points 21 and 22. The main axis of mirror 16 is formed by the tangent in the plane of the drawing of curve 19—20 in point 14.

The optical element is formed as a cylindrical lens 23 having an axial divergence point at 24. Its main axis is perpendicular to the plane of the drawing and intersects it in the center of lens 23. It should be noted that there will be a large number of such divergence points all located in the vicinity of point 24 and that there will be a locus of these points as indicated by the dotted arc through which the axis 17—18 passes, because the lens 23 acts in one direction, namely in the direction of the longitudinal axis of the light source, as a plane-parallel plate and thus the light source 4 is apparently displaced slightly toward lens 23.

The focus 21 lies on or in the immediate vicinity of the locus of the transverse convergence points of the light rays refracted by lens 23 and in the plane of the drawing these light rays apparently proceed from point 21. Consequently lens 23 produces a certain degree of astigmatism which is suppressed by mirror 16. Because of the elliptical shape of mirror 16, the light reflected thereby in the plane of the drawing converge at focus 22, whereas in planes perpendicular to the plane of the drawing, they appear to come from the locus of the axial divergence points 24. These rays are reflected by mirror 16 toward point 22 at which is formed a luminous surface which may be considered as a picture of the light source 4. As shown a film gate 25 of a motion picture apparatus is disposed in the immediate vicinity of point 22, but it may of course coincide with this point.

The optical system shown in Figure 4 is similar in many respects to that of Figure 3 and has similar parts indicated by the same reference numerals as used in Figure 3. However, in Figure 4 a cylindrical elliptical mirror 26 is used instead of the lens 23 of Figure 3. Mirror 26 shows the same shape as mirror 1 out of Figures 1 and 2. The locus of the transverse divergence points passes through the focus 21, whereas the locus of the axial convergence points—indicated by dotted arc 27—is located in the immediate vicinity of mirror 26. Similar to Figure 3, the light source 4 is reproduced as a luminous spot at the focus 22 or in the immediate vicinity thereof.

The system illustrated in Figure 5 comprises a mirror 30 whose active surface is shaped as a surface of revolution. More particularly this surface is formed by rotating about an axis of rotation 31—32, an arc 33—34—35 of a parabola having a focus 36 and an axis 37—38.

The light source 4 is disposed with its longitudinal axis coinciding with the main axis of a cylindrical parabolic mirror 39 formed by moving a portion of a parabola along a straight line perpendicular to the plane of the drawing. Instead of mirror 39 a lens may be used.

As line 33—34—35 is a parabola and due to the parabolic shape of mirror 39, the focus 40, as well as the locus of the transverse divergence points 41, are shifted in the direction of axis 38—37 to infinity as indicated by arrows. The locus of the axial divergence points 42 is located in the vicinity of mirror 39.

In this construction a beam of parallel light rays is directed upon mirror 30, but this beam has a great dispersion in a plane perpendicular to the plane of the drawing and extending in the direction of the beam. However, because of the action of mirror 30 this dispersion is greatly reduced and a picture of the light source is formed at the focus 36, which picture has the proper dimensions in both the transverse and longitudinal directions.

Figure 6 illustrates the case in which the ellipse 19—20 of Figure 1 is altered into a straight line 43—44 due to the displacement to infinity of the foci indicated by reference numerals 45 and 46. Line 43—44 is rotated about an axis 47—48 to form the conical reflecting surface of mirror 49. The axis 47—48 passes through the axial divergence points 51 of the course of the rays emitted by light source 4.

Together with the focus 45 the locus of the transverse divergence points has also shifted to infinity as indicated by reference numeral 52. The rays of the beam of light reflected by mirror 49 are parallel to the axis 47—48 and consequently converge at infinity.

While we have described our invention in connection with specific examples and applications we do not wish to be limited thereto but desire the appended claims to be construed as broadly as is permissible in view of the prior art.

What we claim is:

1. An optical system having a bent axis and comprising a linear light source, means for changing the light emitted by said source into a parallel beam including a cylindrical optical element, and a mirror intercepting said parallel beam, said mirror having an active surface of revolution whose generatrix is a parabola having an axis perpendicular to the axis of revolution of the surface and a focus in the convergence point of the light beam reflected from the surface.

2. An optical system having a bent axis and comprising a linear light source, means for changing the light emitted by said light source into a parallel beam including a cylindrical parabolic optical element, and a mirror intercepting the parallel beam, said mirror having a conical reflecting surface formed by rotating a straight line about an axis passing through the axial divergence point of the course of the rays emitted by the light source and extending perpendicular to the "main" axis of the optical element.

3. An optical system having a bent axis and comprising a linear light source, means for changing the light emitted by said light source into a parallel beam including a cylindrical optical element having a "main" axis coinciding with the axis of the light source, and a mirror having a "double-curvature" reflecting surface intercepting said beam, the "main" axis of said reflecting surface being substantially perpendicular to the "main" axis of said optical element.

JAN BERGMANS.
CLAMOR AUGUST LAMBERTS.